US 9,277,086 B2

(12) United States Patent
Chiang

(10) Patent No.: US 9,277,086 B2
(45) Date of Patent: Mar. 1, 2016

(54) PHOTOGRAPH SORTING METHOD FOR PORTABLE COMMUNICATION DEVICE

(71) Applicant: Kuo-Ching Chiang, New Taipei (TW)

(72) Inventor: Kuo-Ching Chiang, New Taipei (TW)

(*) Notice: Subject to any disclaimer, the term of this patent is extended or adjusted under 35 U.S.C. 154(b) by 0 days.

(21) Appl. No.: 14/265,319

(22) Filed: Apr. 29, 2014

(65) Prior Publication Data
US 2014/0320699 A1 Oct. 30, 2014

(30) Foreign Application Priority Data

Apr. 29, 2013 (TW) .............................. 102115314 A

(51) Int. Cl.
*H04N 5/222* (2006.01)
*H04N 1/21* (2006.01)
*H04N 1/00* (2006.01)
*G06K 9/00* (2006.01)

(52) U.S. Cl.
CPC ......... *H04N 1/2195* (2013.01); *H04N 1/00336* (2013.01); *G06K 9/00288* (2013.01)

(58) Field of Classification Search
CPC ....... H04N 5/232; H04N 5/772; H04N 5/775; H04N 5/765; H04N 5/781; H04N 9/2921; H04N 9/8205; H04N 1/2195; H04N 1/00336; G06K 9/00288

USPC ............................ 348/333.01–333.12, 231.2
IPC ........... H04N 5/232,5/772, 5/775, 5/765, 5/781, H04N 9/2921, 9/8205
See application file for complete search history.

(56) References Cited

U.S. PATENT DOCUMENTS

| | | | |
|---|---|---|---|
| 2003/0064759 A1* | 4/2003 | Kurokawa et al. | 455/566 |
| 2008/0139247 A1* | 6/2008 | Zhang | 455/557 |
| 2009/0316021 A1* | 12/2009 | Nozaki | 348/231.2 |
| 2012/0054311 A1* | 3/2012 | Mizuno | H04N 1/00204 709/218 |
| 2012/0098999 A1* | 4/2012 | Chen | H04N 1/3871 348/231.5 |

* cited by examiner

*Primary Examiner* — Yogesh Aggarwal
(74) *Attorney, Agent, or Firm* — Chih Feng Yeh; Huntington IP Consulting Co., Ltd.

(57) ABSTRACT

A photograph sorting method includes steps of providing a portable device with a control unit, a digital image capturing module coupled to the control unit, a face recognition module coupled with the control unit, a sorting module in coupled with the control unit; followed by capturing an image by the digital image capturing module, and analyzing the image by the face recognition module. The image is sorted based on a result of the face recognition, then, a multiple sorting photo folders is generated based on the result of face recognition by the facial recognition module.

18 Claims, 3 Drawing Sheets

PHOTOGRAPH SORTING METHOD FOR PORTABLE COMMUNICATION DEVICE

CROSS-REFERENCE TO RELATED APPLICATIONS

This present application claims priority to TAIWAN Patent Application Serial Number 102115314, filed on Apr. 29, 2013, which is herein incorporated by reference.

TECHNICAL FIELD

The present invention generally relates to a portable communication device, and especially to a portable communication device with sorting method.

DESCRIPTION OF RELATED ART

Because of the development of the information technology (IT), the information could be exchanged instantly and dynamically. The third generation mobile phone standard allows the user access video communication through air. Thus, certain communication service requiring real time information exchange, such as viewing live video, has become feasible through mobile phone communication network or Internet. When the user place the call, the communicating service provider may offer the service to transmit music designed by the receiving call party for the calling party before the receiving party answer the phone call. The service provided by the telecom service provider charges the service fee to the party. Sometime, the calling party dislikes the music provided by the answer call party. However, the calling party has to suffer the dislike music. On the other hand, photograph folder is not sorted for the image capturing module, it is inconvenient for the user to find certain photograph.

SUMMARY

The main purpose of the present invention is to provide a photo sorting method for a wireless communication device. A photograph sorting method includes steps of providing a portable device with a control unit, a digital image capturing module coupled to the control unit, a face recognition module coupled with the control unit, a sorting module in coupled with the control unit; followed by capturing an image by the digital image capturing module, and analyzing the image by the face recognition module. The image is sorted based on a result of the face recognition, then, a multiple sorting photo folders is generated based on the result of face recognition by the facial recognition module. The digital image capturing module includes CMOS or CCD. The multiple sorting photo folders are divided based on face recognition. The method is sorted based on a photo sticker in a phone number address book. The method further includes an automatic playing module coupled to the control unit. The automatic playing module displays the image when a user makes a call. The automatic playing module terminates the displaying when receives an answering signal.

A photograph sorting method includes providing a portable device with a control unit, a digital image capturing module coupled to the control unit, a face recognition module coupled with the control unit, a sorting module in coupled with the control unit, followed by capturing an image by the digital image capturing module and analyzing the image by the face recognition module. Thereafter, the image is sorted based on a result of the face recognition, a multiple sorting photo folders is generated based on the result of face recognition by the facial recognition module. Subsequently, the photograph in the sorting photo folders is assigned as photo stickers for a phone address book.

DETAILED DESCRIPTION

Figure 1:
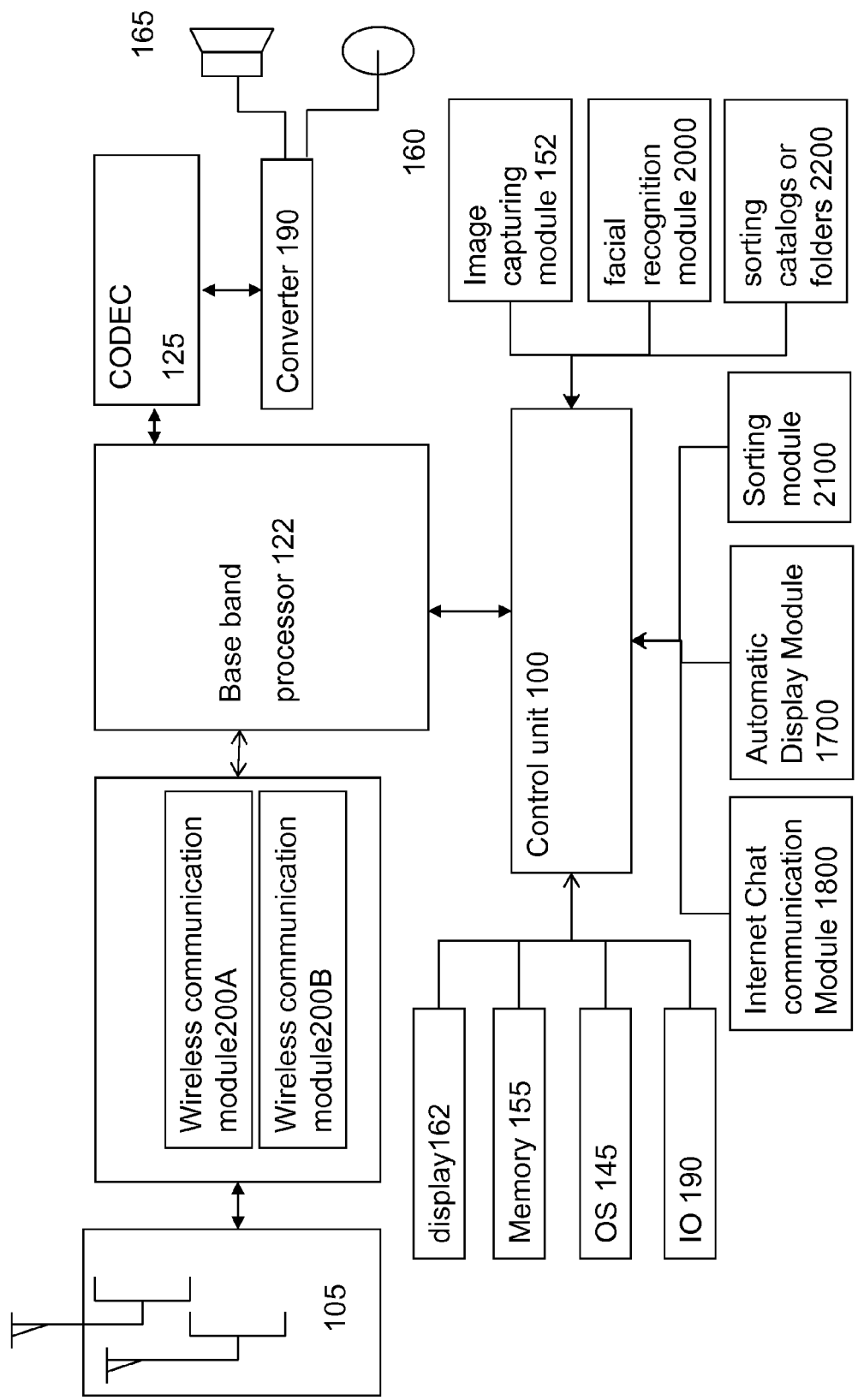
FIG. 1 shows the function diagram of the present invention.

The present invention can be applied to a wireless communication device, which includes, but is not limited to, a cell phone, a smart phone, a tablet. In general wireless communication systems, communication network service providers from different systems or regions use various communication protocols or two-way communication protocol, however, the present invention is not limited to any kinds of protocols. Referring to FIG. 1, it shows a functional diagram of the wireless communication device of the present invention. For simplifying the specification, an embodiment is introduced hereinafter as an explanation, however, it's not used to limit the present invention, namely, the present invention can be modified to facilitate to use other different kinds of communication systems or protocols without departing from the spirit and scope of the present invention. For example, a single chip system can be introduced to integrate the chips or processors hereinafter. The portable communication device includes a control unit 100 which is introduced to process or control the commands, information, data, and computing of the device. Memory 155, for example, non-volatile memory such as flash memory is coupled to the control unit 100. Generally, the operation system 145 or application programs can generally be stored in the non-volatile memory which can still retain the data stored in when power supply is unavailable and can be read or wrote repeatedly when power supply is available. The system operation program and application programs stored in the non-volatile memory control the execution of all necessary functions and can be presented on the main display 162 through the I/O user interface 190 after processed by the CPU or the control unit. The main display 162 is a screen of a general portable communication device, such as LCD or OLED display.

The antenna system 105 may be a multi-band antenna or composed by a plurality of antennas, according to demands. Aforementioned antenna may be dipole antenna, plane antenna, inverted-F Antenna, fractal antenna, etc. The antenna system 105 coupled to a wireless communication module 200A is introduced to receive signals, and the wireless communication module 200A which is suitable for transferring information in movement may generally include: converting signals to IF (intermediate frequency) through oscillator signals of mixing region of a receiver. The converted signals are modified to a bandwidth that the protocol predetermined by a transmitter, and transmitted by the antenna system. A modem is coupled to aforementioned receiver and transmitter to modulate or de-modulate signals. Aforementioned protocol can be an audio/video wireless communication protocol, which may includes, but is not limited to, International Telecommunications Unit (ITU): 3G, 3.5G, 4G, W-CDMA, CDMA2000, CDMA2001, TD-CDMA/TD-SCDMA, UWC-136, DECT. A base band processor 122 which may process the signals with predetermined bandwidth and aforementioned communication protocols is coupled to the modem of aforementioned wireless communication module 100A. A second wireless communication module 200B may be introduced, which may includes, but is not limited to, WiFi, Wimax, or 802.11(a, b, g, n), and the second communication module 200B can exist individually or together with the wireless communication module 200A. Signals processed by the base band processor include control signals and audio signals, the control signals are transmitted to the control unit 100 and the audio signals are transmitted to a CODEC 125; a voice converter 190 is coupled to the CODEC 125 to convert the digital signals to analog signals or convert analog signals to digital signals. A microphone 160 and a speaker 165 are coupled to aforementioned voice converter 190 respectively. Besides, the present invention may also include a digital image capture module 152 connected to the control unit 100 to capture images, which may be a CMOS image sensor or CCD array.

The present invention also includes an instant chat communication module 1800, such as skype, whatapp, line or wechat. These instant chat communication modules 1800 may offer the chat function and also may place an internet phone call. No matter the internet call or the mobile phone call through the mobile phone network, before the answering party answers the call, the present invention may offer the automatic displaying music, image, photo or video. The service may be implanted by an automatic display module 1700. The present invention includes an automatic (on-demand) displaying module 1700, which can be a software program or firmware program implanted in the hand-held communication device's memory and is coupled with the control unit 100. Automatic (on-demand) displaying modules is initiated after the calling party make a call and display or play the video, image or music (audio) before the phone is not answered. The user may customize from the media database for the user automatically tap a song or video playback, so the user can watch or listen the desired video or audio files before waiting the party to answer the call. The user may enjoy the favorite songs, photo or video and omits the service charge form the telecom companies.

Figure 2:
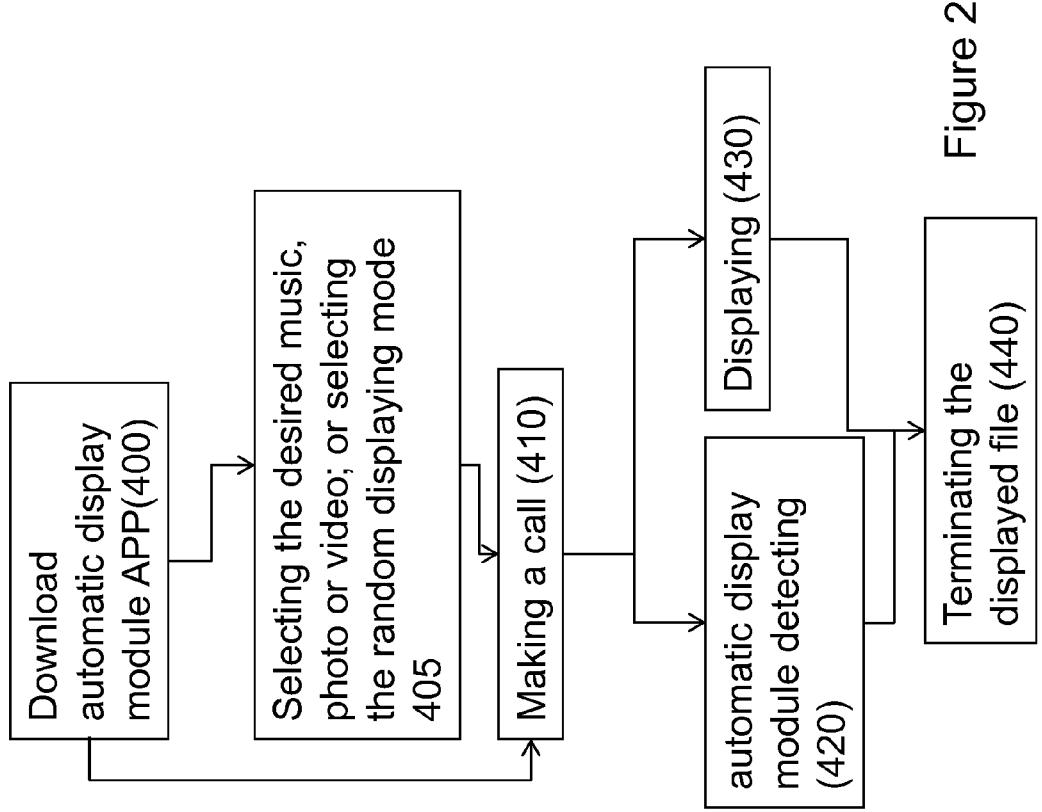
FIG. 2 shows the system of the present invention.

FIG. 2 shows a flow chart of an embodiment in accordance with the present invention, the user terminal may download the APP module from remote server to the user's terminal (step 400). When the user dials the telephone call (410), the calling signal will trigger the automatic playing module 1700 to display video, photo images or play the music. Simultaneously, the automatic display (play) module 1700 automatically detects the answering signal, and plays the audio file (such as a song) by the earphone or displays the video file via the screen.

Figure 3:
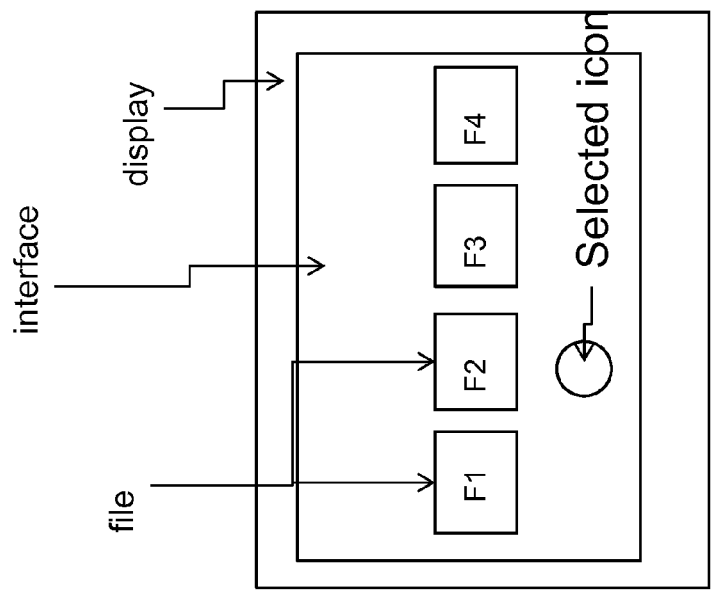
FIG. 3 shows the storage device of the present invention.

After downloaded the automatic display module 1700, the user may customize the automatic on-demand displaying files through the user interface of the automatic display module 1700 (FIG. 3). The user interface is displayed on the display and the user may click the desired files or select the displaying or playing files by random in step 405. Thereafter, the user may make a call in step 410.

Namely, before answering party answering the call, the user can enjoy the displayed video or played music (step 423) through the user's mobile phone display or speaker; during the displaying, and the automatic (on-demand) playing module 1700 simultaneously detects the response from the answering party step 420, the automatic (on-demand) playing module 1700 terminates the play (step 440) if the automatic (on-demand) playing module 1700 detects the reply message in step 450. The steps of 420, 430 may be alternative or be performed in parallel. Current smartphones include multi-tasking or multi-core hardware in which these tasks can be handled without delay. The present invention can be introduced into typical mobile telephone communications, Internet (software) phone, chat communications applications, such as instant messaging program. The automatic playing (displaying) module 1700 may provide a user interface (FIG. 3) for the user to facilitate files selection or provide selection or check button on the desired playback files or randomly selected by the automatic playing (displaying) module 1700, step 405 (optional step). Before the answering call from the answering party, the automatic playing (displaying) module 170 plays the file or files automatically based on the user previous demand. In one embodiment, the displayed files may be multiple photographers by random. The user may review the video or animation or photograph before the answering party answer the call. Generally, the desired files described above are stored in the memory of the user's mobile phone.

Figure 4:
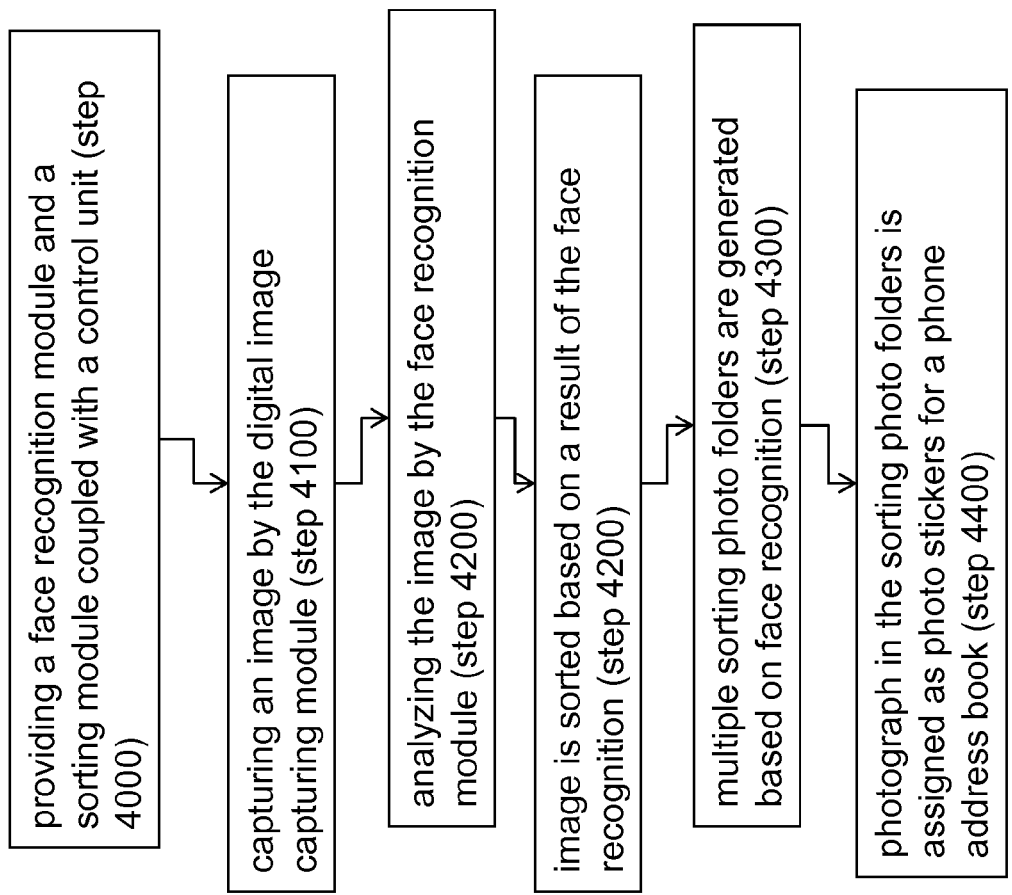
FIG. 4 shows one embodiment of the method to sort photographs according to the present invention.

In one case, the displaying photograph is associated with the answering party or calling party. In one case, the smart phone includes a face recognition module 2000 to identify the captured image captured by the digital camera 152. The facial recognition module 2000 may analysis the captured photographs to sort these photographs into multiple sorting catalogs or folders 2200. Each catalogs or folders 2200 is divided based on the result of face recognition by the facial recognition module 200. The sorting catalogs or folders 2200 may be sorted in association with the photo sticker in the phone number address book. Please refer to FIG. 4, a photograph sorting method includes steps of providing a portable device with a control unit, a digital image capturing module coupled to the control unit, a face recognition module coupled with the control unit, a sorting module in coupled with the control unit (step 4000), followed by capturing an image by the digital image capturing module (step 4100) and analyzing the image by the face recognition module (step 4200). Thereafter, the image is sorted based on a result of the face recognition (step 4200), a multiple sorting photo folders are generated based on the result of face recognition by the facial recognition module (step 4300). Subsequently, the photograph in the sorting photo folders is assigned as photo stickers for a phone address book (step 4400). The assigned photographs may be multiple instead of one. The assigned photographs may be rotationally displayed on the address book or e-mail photograph lists, or the contact name list of the instant communication modules.

The aforementioned units and modules can be combined arbitrarily according to demands. As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

What is claimed is:

1. A photograph sorting method for a cellular having a control unit, a digital image capturing module coupled to said control unit, comprising:

providing a face recognition module within said cellular and coupled with said control unit, a sorting module being in said cellular and coupled with said control unit;

capturing images by said digital image capturing module;

analyzing said images by said face recognition module;

sorting said images based on a result of said face recognition, wherein said sorting is based on a photo sticker in a phone number address book;

generating a multiple sorting photo folders based on said result of face recognition by the facial recognition module.

2. The method according to claim 1, wherein said digital image capturing module includes CMOS or CCD.

3. The method according to claim 1, wherein said multiple sorting photo folders is divided based on face recognition.

4. The method according to claim 1, further comprising an automatic playing module coupled to said control unit.

5. The method according to claim 4, wherein said automatic playing module displaying said image when a user makes a call.

6. The method according to claim 5, wherein said automatic playing module terminates said displaying when receives an answering signal.

7. The method according to claim 5, wherein said automatic playing module is download from a remote server.

8. A photograph sorting method for a cellular having a control unit, a digital image capturing module coupled to said control unit, comprising:

providing a face recognition module within said cellular and coupled with said control unit, a sorting module being in said cellular and coupled with said control unit;

capturing images by said digital image capturing module;

analyzing said images by said face recognition module;

sorting said images based on a result of said face recognition, wherein said sorting is based on a photo sticker in a phone number address book;

generating a multiple sorting photo folders based on said result of face recognition by the facial recognition module;

assigning photograph in said sorting photo folders as photo stickers for a phone address book.

9. The method according to claim 8, wherein said digital image capturing module includes CMOS or CCD.

10. The method according to claim 8, wherein said multiple sorting photo folders is divided based on face recognition.

11. The method according to claim 8, further comprising an automatic playing module coupled to said control unit.

12. The method according to claim 11, wherein said automatic playing module displaying said image when a user makes a call.

13. The method according to claim 11, wherein said automatic playing module terminates said displaying when receives an answering signal.

14. The method according to claim 11, wherein said automatic playing module is download from a remote server.

15. A photograph sorting method for a cellular having a control unit, a digital image capturing module coupled to said control unit, comprising:

providing a face recognition module within said cellular and coupled with said control unit, a sorting module being in said cellular and coupled with said control unit;

capturing images by said digital image capturing module;

analyzing said images by said face recognition module;

sorting said images based on a result of said face recognition;

generating a multiple sorting photo folders based on said result of face recognition by the facial recognition module;

assigning photograph in said sorting photo folders as photo stickers for a phone address book; and displaying said photo stickers when a user makes a call.

16. The method according to claim 15, wherein said digital image capturing module includes CMOS or CCD.

17. The method according to claim 15, wherein said sorting is based on a photo sticker in a phone number address book.

18. The method according to claim 15, wherein said automatic playing module terminates said displaying when receives an answering signal.

\* \* \* \* \*